US008782619B2

(12) United States Patent
Wu et al.

(10) Patent No.: US 8,782,619 B2
(45) Date of Patent: Jul. 15, 2014

(54) EXTENDING PROGRAMMING LANGUAGE SEMANTICS WHILE MAINTAINING STANDARD SYNTAX THROUGH ALIASING

(75) Inventors: Zhe Wu, San Jose, CA (US); Vladimir Kolovski, Cambridge, MA (US)

(73) Assignee: Oracle International Corporation, Redwood Shores, CA (US)

( * ) Notice: Subject to any disclaimer, the term of this patent is extended or adjusted under 35 U.S.C. 154(b) by 325 days.

(21) Appl. No.: 12/912,581

(22) Filed: Oct. 26, 2010

(65) Prior Publication Data

US 2012/0102472 A1 Apr. 26, 2012

(51) Int. Cl.
*G06F 9/45* (2006.01)

(52) U.S. Cl.
USPC .......................... 717/137; 717/136; 717/140

(58) Field of Classification Search
None
See application file for complete search history.

(56) References Cited

U.S. PATENT DOCUMENTS

| | | | | |
|---|---|---|---|---|
| 5,963,934 A * | 10/1999 | Cochrane et al. | ................. | 1/1 |
| 6,067,542 A * | 5/2000 | Carino, Jr. | ................. | 1/1 |
| 7,150,010 B1 * | 12/2006 | Ringseth et al. | ............. | 717/140 |
| 7,765,525 B1 * | 7/2010 | Davidson et al. | ............. | 717/124 |
| 7,971,194 B1 * | 6/2011 | Gilboa | ................. | 717/136 |
| 2003/0101195 A1 * | 5/2003 | Linhart | ................. | 707/102 |
| 2004/0194057 A1 * | 9/2004 | Schulte et al. | ................. | 717/114 |
| 2006/0225052 A1 * | 10/2006 | Waddington et al. | .......... | 717/136 |
| 2006/0235823 A1 * | 10/2006 | Chong et al. | ................. | 707/1 |
| 2007/0256057 A1 * | 11/2007 | Matsubara | ................. | 717/136 |
| 2008/0005728 A1 * | 1/2008 | Morris | ................. | 717/153 |
| 2010/0036862 A1 | 2/2010 | Das et al. | | |
| 2010/0131936 A1 * | 5/2010 | Cheriton | ................. | 717/146 |

OTHER PUBLICATIONS

The #define Directive- Visual Studio 2005 MSDN http://msdn.microsoft.com/en-us/library/teas0593(v=vs.80).aspx.*
GCC—Inline—Assembly—HOWTO Sandeep. S v0.1, Mar. 1, 2003. http://www.ibiblio.org/gferg/ldp/GCC-Inline-Assembly-HOWTO.html.*
namespace Alias—Visual Studio 2005 MSDN http://msdn.microsoft.com/en-us/library/chwe1tc8(v=vs.80).aspx.*
MSDN, article title "The #define Directive" Visual Studio 2005, located at http://msdn.microsoft.com/enus/library/teas0593(v=vs.80).aspx.*
GCC-Inline-Assembly-HOWTO, Sandeep S. v0.1 Mar. 1, 2003, located at http://www.ibiblio.org/gferg/ldp/GCC-Inline-Assembly-HOWTO.html.*
namespace alias—Visual Studio 2005, MSDN, located at http://msdn.microsoft.com/en-us/library/chweltc8(v=vs.80).aspx.*

(Continued)

*Primary Examiner* — Isaac Tecklu
*Assistant Examiner* — Hossain Morshed
(74) *Attorney, Agent, or Firm* — Hickman Palermo Truong Becker Bingham Wong LLP; Anjali Behal

(57) ABSTRACT

A method is provided for allowing programmers to specify program execution control semantics using standard programming language syntax even when the standard language does not provide a language construct for specifying execution control. In a similar manner, the approach provides programmers the ability to extend the expressiveness of a language by introducing statements expressed in the syntax of a target programming language. A program written in a first programming language may be translated into statements of a second programming language, where the target programming language is more expressive than the first. This language-based approach preserves the standard syntax of the first programming language, allowing a program written with semantic extensions to be compiled and run according to the standard on any standards-compliant system.

24 Claims, 3 Drawing Sheets

(56) References Cited

OTHER PUBLICATIONS

Conditional compilation directives, Visual Studio 2003, located at http://msdn.microsoft.com/enus/library/aa691099(v=vs.71).aspx.*
"The Define Directive", Visual Studio 2005, MSDN, located at http://msdn.microsoft.com/enus/library/teas0593(v=vs.80).aspx.*
"GCC-Inline-Assembly-HOWTO", 2005, located at http://www.ibiblio.org/gfreg/Idp/GCC-inline-Assembly-HOWTO.html.*
"MSDN Namespace", 2005, located at http://msdn.microsoft.com/enus/library/chweltc8(v=vs.80).aspx.*
"MSDN Conditional Compiling", 2005, located at http://msdn.microsoft.com/enus/library/aa691099(v=vs.71).aspx.*
Herman, Ivan, "W3C Semantic Web Activity," W3C, http://www.w3.org/2001/sw/, 1994, 5 pp., printed Mar. 14, 2011.
Beckett, Dave, "RDF/XML Syntax Specification Revised", W3C, 2004, 51 pages, http://www.w3.org/TR/REC-rdf-syntax/, printed Mar. 14, 2011.
Manola, Frank, et al., "RDF Primer", W3C, 2004, 109 pages, http://www.w3.org/TR/rdf-primer/, printed Mar. 14, 2011.
Prud'Hommeaux, Eric et al., "Sparql Query Language for RDF," W3C, 2006-2007, 105 pages, http://www.w3.org/TR/rdf-sparql-query/, printed Mar. 14, 2011.
"Jena—A Semantic Web Framework for Java," Sourceforge.net, 1 page. http://www.jena.sourceforge.net, printed Mar. 14, 2011.
Aduna, "OpenRDF.org . . . home of Sesame", 2009, 1 page, website, http://www.openrdf.org, Printed Mar. 14, 2011.
Oracle.com, Software Downloads, 1 page, http://www.oracle.com/technology/software/tech/semantic_technologies/index.html, printed Mar. 14, 2011.
Miller, Eric, "Figure 1: An RDF Graph Describing Eric Miller," pp. 4 of 109, http://www.w3.org/TR/rdf-primer/#figure1, printed Mar. 14, 2011.
Website for OpenLink Software, http://www.openlinksw.com/, 2 pages, Printed Mar. 14, 2011.
Franz Inc., "AllegroGraph, RDFStore 4.2," 1 page, http://www.franz.com/agraph/allegrograph, printed Mar. 14, 2011.
Ontotext, "BigOWLIM Semantic Repository," 1 page, http://www.ontotext.com/owlim/big/, printed Mar. 14, 2011.
3STOREWEBSITE, Download 3store software for free at SourceForge.net, 2 pages, http://www.sourceforge.net/projects/threestore/, printed Mar. 14, 2011.
Systap, LLC, "Bigdata", 2008, 4 pages, http://www.systap.com/bigdata.htm, printed Mar. 14, 2011.
Novoselsky, Anguel et al., "XIPE", An XML Integrated Processing Environment, Proceedings of the $4^{th}$ International Conference on Software and Data Technologies, vol. 1, Sofia, Bulgaria, Jul. 26-29, 2009, 8 pages.

* cited by examiner

| Schema Triples | | |
| --- | --- | --- |
| Subject | Predicate | Object |
| Reviewer | rdfs:subClassOf | Person |
| Faculty | rdfs:subClassOf | Reviewer |
| Student | rdfs:subClassOf | Reviewer |
| Ph.D Student | rdfs:subClassOf | Student |
| ChairpersonOf | rdfs:domain | Person |
| ChairpersonOf | rdfs:range | Conference |
| ReviewerOf | rdfs:domain | Reviewer |
| ReviewerOf | rdfs:range | Conference |
| Age | rdfs:domain | Person |
| Age | rdfs:range | xsd:int |

201

| Data Triples | | |
| --- | --- | --- |
| Subject | Predicate | Object |
| ICDE 2005 | rdf:type | Conference |
| John | Age | 24 |
| John | rdf:type | Ph.D Student |
| John | ReviewerOf | ICDE 2005 |
| Mary | rdf:type | Faculty |
| Mary | ChairpersonOf | ICDE 2005 |
| Mary | Age | 29 |
| Tom | Age | 22 |
| Tom | rdf:type | Ph.D Student |
| Tom | ReviewerOf | ICDE 2005 |
| Gary | Age | 23 |
| Gary | rdf:type | Ph.D Student |
| Gary | ReviewerOf | VLDB 2005 |
| Bob | Age | 21 |
| Bob | rdf:type | Ph.D Student |
| Bob | ReviewerOf | VLDB 2005 |

203

205 {
207(1) '(?r ReviewerOf ?c)
207(2) (?r rdf:type Ph.D. Student)
207(3) (?r Age ?a)',

FIG. 2
*PRIOR ART*

EXTENDING PROGRAMMING LANGUAGE SEMANTICS WHILE MAINTAINING STANDARD SYNTAX THROUGH ALIASING

FIELD OF THE INVENTION

The present invention relates to overloading standard programming language syntax to specify non-standard semantics.

BACKGROUND

RDF

RDF is a widely-used language that was originally developed for representing information (metadata) about resources in the World Wide Web. It may, however, be used for representing information about absolutely anything. When information has been specified using the generic RDF format, it may be consumed automatically by a diverse set of applications.

Facts in RDF are represented by RDF triples. Each RDF triple represents a fact and is made up of three parts, a subject, a predicate (sometimes termed a property), and an object. FIG. 1 and FIG. 2 provide an RDF example. The fact represented by the English sentence "John is 24 years old" can be represented in RDF by the subject, predicate, object triple <'John', 'age', '24'>, with 'John' being the subject, 'age' being the predicate, and '24' being the object. In the following discussion, the values in RDF triples are termed lexical values. In current RDF, the values of predicates must ultimately resolve to lexical values termed universal resource identifiers (URIs), and the values of subjects must ultimately resolve to lexical values termed URIs and blank nodes.

In the triples, the lexical values for the object parts may be literal values. In RDF, literal values are strings of characters, and can be either plain literals (such as "Conf 2005") or typed literals (such "24"^^xsd:integer). The interpretations given to the lexical values in the members of the triple are determined by the application that is consuming them. For a complete description of RDF, see Frank Manola and Eric Miller, RDF Primer, published by W3C and available in September 2004 at www.w3.org/TR/rdf-primer/. The RDF Primer is hereby incorporated by reference into the present patent application.

Universal Resource Identifiers (URI's)

A URI is a standardized format for representing resources on the Internet, as described in RFD 2396: Uniform Resource Identifiers (URI): Generic Syntax, www.ietf.org/rfc/rfc2396.txt. RFD 2396 is hereby incorporated by reference into the present patent application. The following are examples of URIs:
  http://www.w3.org/2000/01/rdf-schema#Resource
  http://www.w3.org/1999/02/22-rdf-syntax-ns#type
  http://example.org/family/Female
  http://www.w3.org/2000/01/rdf-schema#subClassOf
  http://example.org/family/Person

SPARQL

In January 2008, W3C standardized SPARQL, which is a pattern-matching based query language for RDF. SPARQL can be used to formulate queries across multiple RDF data sources. SPARQL contains capabilities for querying required and optional graph patterns along with their conjunctions and disjunctions. SPARQL also supports extensible value testing and constraining queries by source RDF graph. The results of SPARQL queries can be result sets or RDF graphs.

A basic SPARQL query may include a SELECT clause, a WHERE clause, and one or more query variables. A SPARQL query may also include one or more prefix bindings, one or multiple FROM clauses, one or multiple FROM NAMED clauses, a GRAPH clause, an ORDER BY clause, etc. An example SPARQL query on the example RDF data from FIG. 2 is shown below:

```
PREFIX rdf: <http://www.w3.org/1999/02/22-rdf-syntax-ns#>
SELECT ?x
WHERE {
    ?x rdf:type <urn:Student>
}
```

The query above finds all triple with subjects ?x such that ?x has a relationship rdf:type with the URI <urn:Student> and returns the subject of those triples. The result returned from this query would be: {John, Tom, Gary, Bob}. It can be inferred that John, Tom, Gary, and Bob are students because each of them is a PhDStudent, and PhDStudent is a subclass of Student. Thus, each (instance of) PhDStudent is also a (instance of) Student.

For more detailed information about SPARQL, see:
  http://www.w3.org/TR/rdf-sparql-query/

Extending Language Support

Programmers write programs in standard programming languages so that the same program may run on different computer platforms and exhibit the same behavior. Conformance to a standard ensures portability of code so that a single version of a program may be written and maintained.

The official SPARQL standard defines both the syntax and semantics of the language. The syntax dictates the set of reserved words and their parameters as well as the correct word order in an expression of the language. Standardized syntax is necessary for a program to be interpreted in a consistent manner across compilers and interpreters that process a program written in the programming language.

As the terms are used herein, an interpreter executes source code submitted to it; a compiler does not execute the source code but instead generates another body of code for execution, such as Java byte code or machine code. A pre-processor translates source code for subsequent interpretation by an interpreter or compiler, and the target of the pre-processor transaction may be expressed in another programming language.

The semantics of the language-supported constructs is also defined by the language standard. The semantics of a language construct specifies the behavior that the program exhibits as a result of processing the construct at pre-processing time, interpretation/compilation time, and at execution time. For example, the statement "x=y+3" instructs the compiler to generate code for retrieving a value from a variable y, adding 3 to it, and storing the result in a variable x. At execution time, this statement has the effect of performing the addition and storing the value in a location in volatile memory.

Sometimes, however, there is a need to express a desired program behavior and there is no supported language construct that specifies the desired behavior. The problem is especially important for a language like SPARQL. The SPARQL query language specifies the syntax for expressing queries over RDF graphs, but SPARQL does not provide constructs for controlling the execution flow, nor does SPARQL provide access to many built-in functions that are available in other query languages such as SQL. For example, database systems running real-world applications need to establish timeouts, determine the degree of parallelism to use, or receive and use other hints for optimizing query execution. SPARQL does not define any construct that has the semantics of providing these control features (such as a pragma directive).

Described herein are ways of expressing in a computer language behavior not specified by the semantics of the computer language.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 depicts relational tables used to manage the data in an RDF graph, according to an embodiment of the invention.

DETAILED DESCRIPTION

Figure 1:
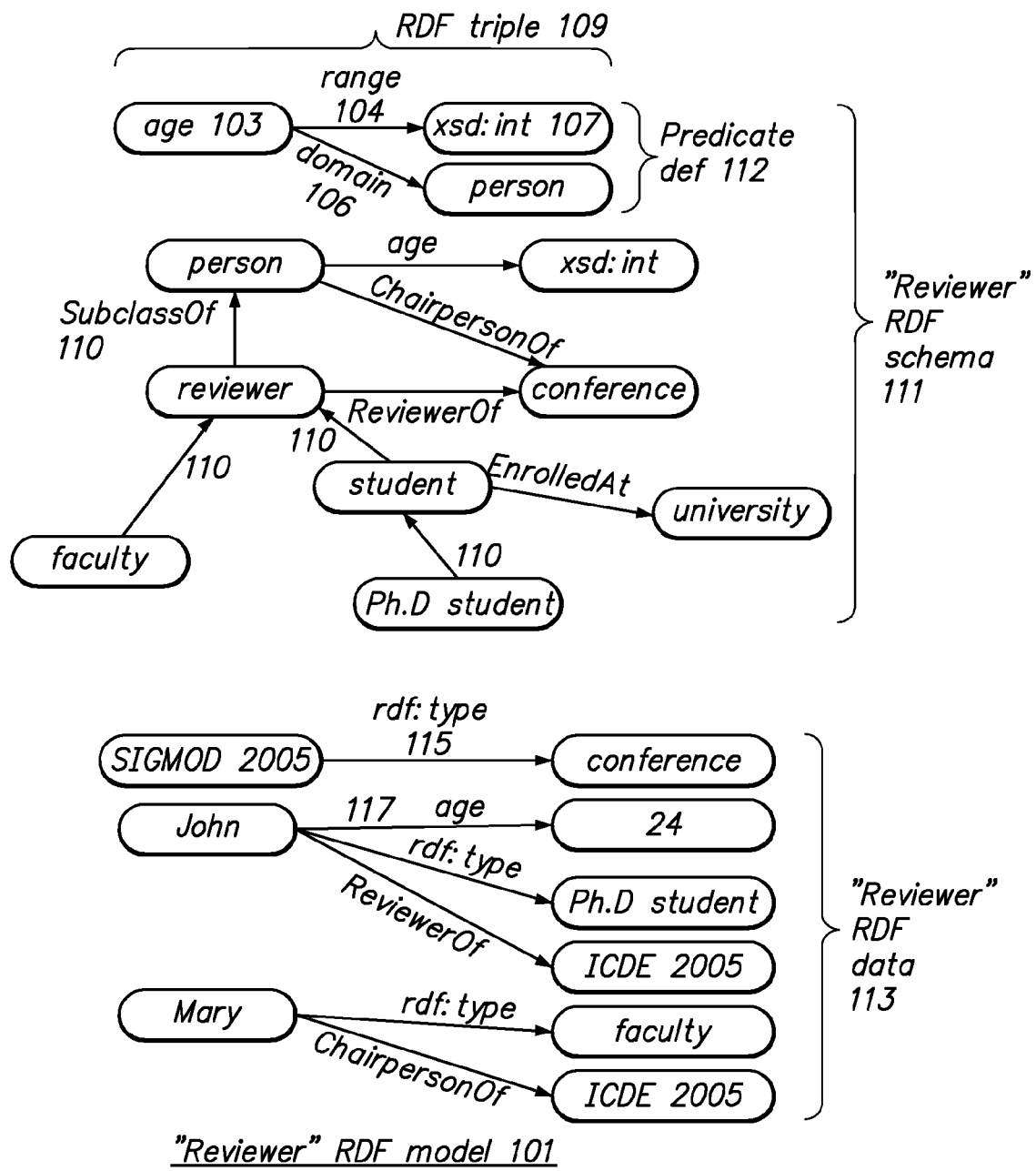
FIG. 1 is a diagram that shows an example RDF graph, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Programming language statements specify desired program behavior. When the desired behavior cannot be specified in the source programming language, various approaches may be used. One approach is to extend the syntax of the programming language beyond what is specified in the language standard to allow programmers to specify the desired behavior. Extending the language syntax to provide a language construct for controlling execution on a particular system results in non-standard programs. Programs that rely on extensions supported by one system may not compile on another system that does not support those same non-standard extensions.

Another approach is to embed code within a comment structure that is defined as legal syntax for the programming language. The code embedded within the comment may be interpreted as providing semantics beyond what is supported by the programming language. For example, if a comment in a C program were:

/* this is a comment with embedded code: #timeout=10*/a custom C pre-processor could interpret #timeout=10 to generate a code that would control the execution of the program so that any wait state would be interrupted after 10 seconds. Even if "timeout=10" is legal C syntax, the standard C compiler (unextended) would interpret the syntax to assign a value to a program variable named timeout. It would not have the effect of generating a timeout during the execution of the program.

A custom pre-processor may interpret the code embedded in the comment to specify desired program behavior that is not included in the semantics of the language. This approach does not require the syntax to be extended. However, not all languages support comments. In particular, there is no comment construct specified in the standard SPARQL language. In addition, even for languages that support comments, the text of comments may be ignored. A comment is intended to provide programmer-friendly documentation of the code to enable easier maintenance. A comment is not intended to have any operational effect.

The technique presented herein introduces another option for responding to the dilemma of allowing programmers to write programs that adhere to the standard while providing non-standard semantics. This is done by using a language-supported syntactic construct and overlaying new extended semantics such that a program can be processed with no adverse affects by a SPARQL language processor that does not support the extended semantics.

As mentioned earlier, SPARQL provides no execution control constructs, such as a pragma. As the term is used herein, a pragma is a construct that specifies a manner of computing a result for other constructs in a body of source code. A pragma does not specify what the result of a construct should be, only how the result is computed. For example, an SQL statement may contain a query optimizer hint, directing the optimizer to perform a particular kind of join between tables. The particular join should not alter computer behavior by changing the results returned for query but may alter the behavior by affecting what particular kind of join is used to compute the result.

In addition to introducing support for execution control, the technique herein provides the ability to extend the expressiveness of the source programming language by introducing additional code that is expressed in a different, target programming language that provides the needed programming features.

Use of Aliasing Constructs

Some modern programming languages standards provide for an alias construct to specify alternative ways of expressing the same identifier. An alias construct is comprised of an alias expression and an equivalent expression. For some programming languages, a pre-processor replaces the equivalent expression for all instances of the alias expression before the program is compiled or interpreted. In this context, an alias (alias expression) is a name, expressed in a body of source code and usually short and easy to remember and type, that is translated into another name or string (equivalent expression), that is usually long and difficult to remember or type. Alternatively, the source code may be interpreted as if the alias expression and the equivalent expression are identical without any substitution at pre-processing time. The use of aliases at the source code level is convenient for reducing the amount of code or the number of characters that must be entered to write a program when a long identifier is used frequently in the program. Examples of languages that support general-purpose aliasing constructs include C/C++ (#define) and Pascal (alias).

XML-based languages such as XQuery support a namespace attribute such as:

xmlns=http://www.w3.org/1999/xhtml.

Although the primary function of a namespace attribute is to define a scope for differentiating identifiers so that the same identifier may be used within different contexts that may be defined independently from one another, the namespace prefix is literally replaced with its corresponding resource identifier. Thus, a namespace prefix has the effect of an aliasing directive because a short prefix may be used to represent a much longer resource name, and the longer name is substituted for the shorter name when executing the program.

As shall be explained in further detail, an alias directive may be used to specify a semantic other than the substitution prescribed for in the standard computer language. For purposes of exposition, this technique is illustrated in the context of SPARQL queries and language; however, the technique can be used for code written in many other computer languages. Such aliases are referred to herein as overloaded aliases.

Processing SPARQL Queries

As seen by the tables in FIG. 2, the RDF graph data may be stored and managed in relational database tables. The data may be accessed through relational operations such as through a relational query language like SQL. In an embodiment, a SPARQL language processor is a software component of a database system that translates a SPARQL query into SQL statements that access the RDF data stored in the underlying relational tables residing in a relational database management system (RDBMS). The SPARQL language processor translates a SPARQL statement into one or multiple SQL statements (proprietary or other forms of SQL) that refer to the base database structures that store RDF data. The RDBMS evaluates and executes the translated SQL statements.

SPARQL defines a PREFIX statement that allows a programmer to specify a substitute namespace alias. Because a namespace prefix of a URI tends to be very long, it is convenient to specify a shorthand or abbreviation to represent the longer namespace prefix. Thus a PREFIX statement allows specifying an abbreviation that can be used by programmers when specifying URI's. The full prefix namespace (also referred to as the expansion string herein) is substituted for the abbreviation at pre-processing time. Thus, PREFIX is an aliasing mechanism that is specific to namespace prefixes.

The PREFIX construct in SPARQL may be used to express semantics understood and supported by the database system, even when not supported by SPARQL itself. To achieve this, the PREFIX expansion is translated into an SQL statement, where the effect of the translated SQL statement, when executed, impacts the database system to behave in a certain manner for which there is no specification in SPARQL. Whereas the SPARQL semantics for a PREFIX statement is to expand an abbreviation used as a namespace prefix with the expansion string that is intended to be a full prefix namespace, the new semantics enabled by an extended SPARQL language processor is that the generation of target SQL code is based on the expansion string contents. For example, the PREFIX expansion string may specify a pragma to the database system that controls how to process the SQL statements that were generated from the translation of a SPARQL query.

PREFIX as Pragma

The PREFIX statement in SPARQL defines a namespace. The standard syntax defined by the SPARQL language is:
PREFIX <nameprefix>:<URI>
(e.g. PREFIX rdf: <http://www.w3.org/1999/02/22-rdf-syntax-ns#>)
This example PREFIX statement specifies that wherever in the code an identifier appears with the prefix "rdf:", it will be replaced with the specified URI. For example rdf:foo will be rewritten as <http://www.w3.org/1999/02/22-rdf-syntax-ns#foo>

The programmer may supply any name prefix definition in the PREFIX statement. The language does not require that there be an identifier in the code that uses the defined prefix. Thus, the language-supported PREFIX statement may include information that provides control information to a compiler or interpreter that looks for such directives. For example: when the SPARQL language processor processes:
PREFIX ORACLE_SEM_FS_NS: <http://oracle.com/semtech#timeout=10>
the language processor may generate an SQL pragma (a SQL session parameter setting, or a JDBC API call), which when executed, may signal to the database engine that if the program has not finished executing within 10 seconds, the program should be aborted.

In an embodiment, the way in which the expansion string is processed is specified by the prefix name. In the above example, the extended language processor interprets the prefix ORACLE_SEM_FS_NS to mean that the part of the expansion string past the "#" character is a custom directive that guides the generation of an SQL pragma. The language processor may process the expansion string of a different prefix in a different way. In an embodiment, the language processor may interpret the characters in the expansion string that appear before the "#" as a URL and retrieve additional processing directives at that location.

The name ORACLE_SEM_FS_NS is chosen so as to be unlikely to conflict with a prefix that the programmer would want to use for defining a real name space. Thus, the name prefix is unlikely to be used for the purpose of aliasing as intended by the language standard. However, the program with the example PREFIX statement would be interpreted as compliant with standard syntax and would run with behavior as dictated by the language standard on a non-Oracle engine. That is, an unenhanced SPARQL language processor would not generate the SQL execution control pragma, and the program would run without generating a 10 second timeout according to the SPARQL standard.

Other examples of useful pragmas for query execution control include:
Degree of parallelism: The programmer may specify how many parallel threads of execution may be used in the execution of the program.
Killing long running queries: A pragma may specify the query id of a long running query when a timeout is not specified. The query id may be used as a handle to the query later on for performing management operations on the query, such as killing the query execution if necessary.
Hints for optimizing SQL: Optimizer hints may be provided in SPARQL statements to a relational database system that translates the SPARQL statement into SQL.

Adding Predicates Expressed in Another Language

In addition to specifying query execution control information in an overloaded alias statement, an additional predicate can be defined that will cause the SPARQL language processor to generate an additional predicate in the WHERE clause of the query. The additional predicate is expressed in SQL based on the PREFIX expansion string. This is useful when there is a predicate that is needed but there is no construct in the language to express it. For example, SPARQL does not define any capability for sophisticated string manipulations. Thus, an additional predicate can be automatically added to the predicate list by expressing a string operation in the target programming language. In our example, the target programming language is SQL. Thus, here is an example SPARQL query that uses an additional predicate as an alias:

```
PREFIX ORACLE_SEM_AP_NS: <http://...#substr(?c, 6, 4)='2004'>
Select ?r ?c
Where {?r Reviewer of ?c}
```

The enhanced language processor interprets the prefix ORACLE_SEM_AP_NS to provide an additional predicate ("AP" stands for Additional Predicate). The characters following the "#" in the expansion string are literally added to the SQL Where clause. Note that when the characters after the '#' are too complex to conform to the URI syntax, one can easily encode them using URL encoding.

The above SPARQL program finds all triples where the subject has a Reviewerof relationship with a conference ?c, and the values of the reviewers ?r and conferences ?c are selected. However, due to the PREFIX statement, the reviewers and conferences in all such triples will not be returned, but rather, only those reviewers and conferences in triples in which the conference is dated in 2004 will be returned. The statement following the "#" in the value of ORACLE_SEM_AP_NS: is added to the list of predicates in the WHERE clause of only that one query. In this case "substr(?c, 6, 4)='2004'" has the effect of extracting characters numbered 6 through 9 from the conference names and filtering the triples selected to only those that conferences where the extracted year is 2004.

SPARQL Protocol

In addition to the language standard, there is also a SPARQL protocol standard. The protocol standard specifies how a SPARQL query may be provided by a web service. That is, the protocol defines the request/response protocol by which a client may send a SPARQL query to a server and receive back a response to the query. An alternative approach to controlling the processing of SPARQL programs is to extend the SPARQL protocol rather than the language. Extra parameters may be added to a request for query evaluation or additional return values may be provided in the response. However, this type of non-standard extension would break interoperability between SPARQL clients and servers implementing the protocol.

A benefit of the language-based approach described herein is that a SPARQL program that uses the enhanced language-based semantics will run on any standard SPARQL server.

Other Embodiments

As mentioned earlier, SPARQL is not the only language that supports an aliasing feature. Both imperative languages, such as C and Pascal, as well as declarative languages, such as SQL, that support an aliasing construct can use the techniques described herein. The aliasing feature of many computer languages, both for interpreters or compilers, may be used to specify a pragma or to embed code from a different programming language. In this way, an overloaded alias may be used to specify semantics for not only pre-processing of source code.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
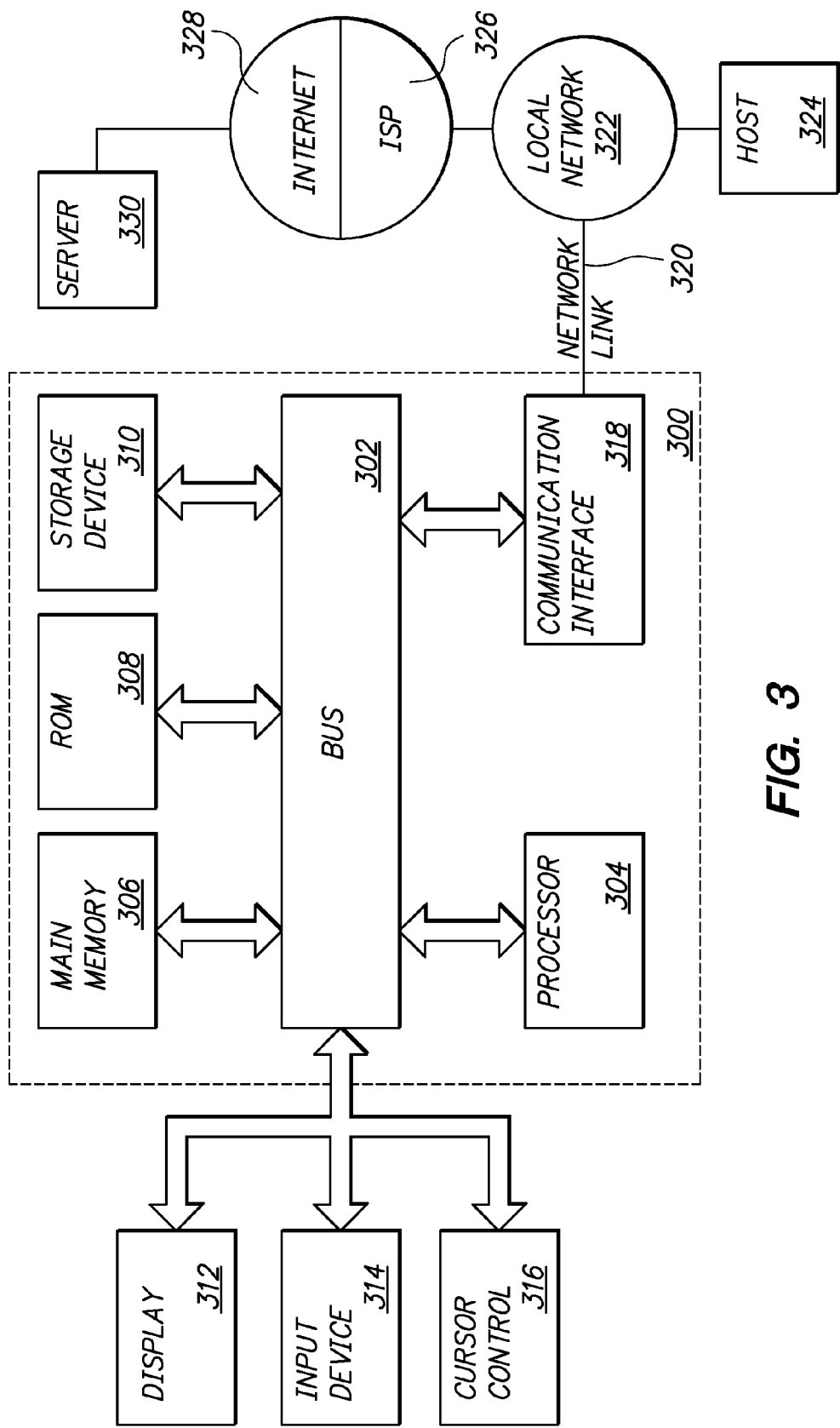
FIG. 3 is a block diagram of a computer system used to implement an embodiment of the present invention.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   a code processor pre-processing a set of statements that conform to a computer programming language standard, said set of statements including a first aliasing directive and a second aliasing directive, both of which conform to a syntax defined by the computer programming language standard;
   wherein said syntax specifies that an aliasing directive includes an alias expression and a substitute expression;
   wherein the first aliasing directive includes a first alias expression and a first substitute expression and the second aliasing directive includes a second alias expression and a second substitute expression;
   wherein a semantic specified by said computer programming language standard for an aliasing directive is that instances of an alias expression in the set of statements are replaced with a substitute expression corresponding to the aliasing directive during pre-processing of the set of statements;
   wherein the second substitute expression specifies a processing directive having a semantic different than any semantic specified by said computer programming language standard for a substitute expression of an aliasing directive;
   wherein said set of statements does not refer to the second alias expression outside of the second aliasing directive;
   wherein said code processor pre-processing the set of statements includes:
   replacing the first alias expression with the first substitute expression;
   pre-processing the second aliasing directive by generating code to carry out the processing directive specified in the second substitute expression.

2. The method of claim 1, wherein
   the second aliasing directive contains a pragma for controlling query execution; and
   in response to interpreting said pragma, the code processor executing said set of statements further comprises performing one of:
   a) setting a timeout for a query;
   b) controlling a number of parallel execution threads to execute a query; or
   c) providing hints to a query optimizer for optimizing a query execution plan.

3. The method of claim 1, wherein
   said computer programming language standard defines a first programming language;
   the substitute expression of said second aliasing directive contains program source code for a second programming language, wherein the program source code for the second programming language is not syntactically correct in said first programming language.

4. The method of claim 3, wherein the code processor translates said set of statements in said first programming language into said second programming language.

5. The method of claim 1, wherein the code processor is comprised of a programming language compiler.

6. The method of claim 1, wherein the code processor is comprised of a programming language interpreter.

7. The method of claim 1, wherein the second aliasing directive defines a namespace prefix.

8. The method of claim 1, wherein the second aliasing directive defines a macro.

9. The method of claim 7, wherein a substitute expression for the namespace prefix is a URI.

10. The method of claim 7, wherein a substitute expression for the namespace prefix is a URL.

11. The method of claim 10, wherein content retrieved at a location of the URL includes query execution control directives.

12. The method of claim 10, wherein content retrieved at the URL includes one or more expressions coded in a second programming language.

13. A non-transitory computer-readable storage medium storing one or more sequences of instructions which, when executed by one or more processors cause:
  a code processor pre-processing a set of statements that conform to a computer programming language standard, said set of statements including a first aliasing directive and a second aliasing directive, both of which conform to a syntax defined by the computer programming language standard;
  wherein said syntax specifies that an aliasing directive includes an alias expression and a substitute expression;
  wherein the first aliasing directive includes a first alias expression and a first substitute expression and the second aliasing directive includes a second alias expression and a second substitute expression;
  wherein a semantic specified by said computer programming language standard for an aliasing directive is that instances of an alias expression in the set of statements are replaced with a substitute expression corresponding to the aliasing directive during pre-processing of the set of statements;
  wherein the second substitute expression specifies a processing directive having a semantic different than any semantic specified by said computer programming language standard for a substitute expression of an aliasing directive;
  wherein said set of statements does not refer to the second alias expression outside of the second aliasing directive;
  wherein said code processor pre-processing the set of statements includes:
    replacing the first alias expression with the first substitute expression;
    pre-processing the second aliasing directive by generating code to carry out the processing directive specified in the second substitute expression.

14. The non-transitory computer-readable storage medium of claim 13, wherein
  the second aliasing directive contains a pragma for controlling query execution; and
  in response to interpreting said pragma, the code processor executing said set of statements further comprises performing one of:
    a) setting a timeout for a query;
    b) controlling a number of parallel execution threads to execute a query; or
    c) providing hints to a query optimizer for optimizing a query execution plan.

15. The non-transitory computer-readable storage medium of claim 13, wherein
  said computer programming language standard defines a first programming language;
  the substitute expression of said second aliasing directive contains program source code for a second programming language, wherein the program source code for the second programming language is not syntactically correct in said first programming language.

16. The non-transitory computer-readable storage medium of claim 15, wherein the code processor translates said set of statements in said first programming language into said second programming language.

17. The non-transitory computer-readable storage medium of claim 13, wherein the code processor is comprised of a programming language compiler.

18. The non-transitory computer-readable storage medium of claim 13, wherein the code processor is comprised of a programming language interpreter.

19. The non-transitory computer-readable storage medium of claim 13, wherein the second aliasing directive defines a namespace prefix.

20. The non-transitory computer-readable storage medium of claim 13, wherein the second aliasing directive defines a macro.

21. The non-transitory computer-readable storage medium of claim 19, wherein a substitute expression for the namespace prefix is a URI.

22. The non-transitory computer-readable storage medium of claim 19, wherein a substitute expression for the namespace prefix is a URL.

23. The non-transitory computer-readable storage medium of claim 22, wherein content retrieved at a location of the URL includes query execution control directives.

24. The non-transitory computer-readable storage medium of claim 22, wherein content retrieved at the URL includes one or more expressions coded in a second programming language.

* * * * *